Patented June 12, 1928.

1,673,043

UNITED STATES PATENT OFFICE.

HELLMUT FISCHER, OF BERLIN-FRIEDENAU, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

METHOD FOR THE PRODUCING OF TECHNICAL PURE BERYLLIUM RESPECTIVELY FOR FREEING METALLIC BERYLLIUM FROM IMPURITIES.

No Drawing. Application filed December 7, 1925, Serial No. 73,914, and in Germany September 10, 1925.

The present invention relates to improvements in methods for the producing of technical pure beryllium or more precisely to a method for freeing metallic beryllium from impurities.

Metallic beryllium produced after the methods hitherto known contains commonly impurities, especially oxide and slag, which are very difficult and in some cases even impossible to remove. This is chiefly due to the very great reactability of the metal at high temperatures and to its relatively high melting point (circa 1285° C). A smelting in the atmosphere is a priori excluded, because the metal would oxidize, but also a working in most of the other gases is impossible on account of the high affinity of the metal. It would perhaps be possible to work in a few kinds of gases, for instance noble gases, hydrogen or a completely evacuated space. A smelting in such gaseous atmosphere or in vacuum is however connected with great difficulties because the impurities such as oxide and slag which are inevitable in any primary process for the producing of beryllium, will diffuse into the flux and form a contamination, which it is very difficult to remove.

It has already been tried in laboratories to purify small quantities of impure beryllium by compressing the metal tinsels in a hollow cylinder of magnesium oxide and heating the cylinder with contents to the melting point of the beryllium in a hydrogen atmosphere, whereby the metal will drip down from the bottom of the cylinder and is collected in a suitable way. This method is however not suited for a technical producing of greater quantities of the metal.

The object of the present invention is a method, which makes it possible in a simple way to purify any desired quantity of beryllium by a remelting or a melting down process. According to the invention the metal is melted in a fluid flux consisting of foreign substances which will not react with beryllium. The boiling point of the flux ought initially to be higher than the melting point of the metal. The flux will thereby cover the beryllium with an air-tight pellicle or skin, so that no air will come into contact with the metal.

An important condition for the selection of a suitable flux is that this must in no way enter into undesired reactions with the beryllium. In the new process therefore preferably a flux is employed which consists of salts of alkalies or of alkaline earths, such as halogenides, and the presence of silicates, borates, phosphates and similar reducible salts must be avoided. It is advantageous to choose such salts as are stable at the temperature of the melting beryllium and which near the melting temperature of the metal do not have too high a vapor pressure. To facilitate the removal of the metal the solidification point of the salts which are used as a flux must lie as much as possible below the melting point of the beryllium and its density should be greater than the density of the melted beryllium. Such salts should be preferred which have a low viscosity at the temperatures which are employed in the process. The best salts are those which besides having the above named properties also are capable of dissolving and taking up the admixtures of oxide and slag which are present in the raw material.

Especially suitable for the melting process are the halogenides of the alkaline earths, best of all the chlorides and fluorides of barium and calcium. These substances may be used single or mixed with each other. Also a melting with an addition of alkalihalogenides will give good results. A prefered salt-mixture is a mixture of one part of calcium chloride which is free of water and one part of calcium-fluoride. This mixture will melt at circa 950° C. and possesses the above mentioned properties. A similar mixture having an addition of sodium chloride is also very effective. These compounds or mixtures possess all or the most of the advantageous properties mentioned above.

The metal to be melted is preferably not charged into the flux before this has reached a temperature of 1300° C. A stirring during the charging or during the melting process is advantageous. The remelted or recrystallized metal may either be ladled out in hot state or may be removed after the cooling as a solidified regulus. The melting process may be continued for an undefined period with any desired amount of metal, during which the flux from time to time must be partly renewed.

In the practice the new method may for instance be carried out as follows:

1 kg. calcium fluoride and 1,5 kg. barium chloride which is free of water are heated together until a homogeneous fluid flux is obtained which has a temperature of 1300–1400° C. Thereupon circa 100 g. impure beryllium, for instance in pieces of different sizes are brought into the flux, preferable with stirring. The beryllium will now melt in the flux and the different pieces will float together in a single lump. The flux is now cooled to circa 1000° C. At this temperature the salt mixture or flux is still fluid but the beryllium has solidified in the form of a single compact lump and may be removed from the bath. Eventual external impurities on the beryllium may be removed by mechanical means, for instance by means of emery.

It is not necessary to cool the flux to 1000° C. in order that the beryllium may solidify. The metal may also be removed in fluid state and be filled in moulds, whereby the finished commercial product is obtained in a suitable shape for instance in the form of bars.

Instead of a plurality of pieces also a single piece of impure beryllium may be brought into the flux. The piece of metal will then be purified through the remelting which takes place.

The beryllium which is produced after the present method is technical pure and is free of oxide and slag.

The method may be carried out in a much simpler way if the compact metal piece only has an external layer of oxide and slag. Such beryllium metal is obtained in the known processes for the producing of the metal such as the melting flux electrolysis or a pure chemical reduction. In order to remove such external impurities a flux preferably of halogenides such as alkali chloride is prepared and is heated only to 600° C. Thereupon the beryllium to be purified is immersed completely into the flux in which it remains for some time without losing its compact form. Already after a short time, usually a few minutes, the flux has dissolved the outer layer of impurities. The compact beryllium which now is technically pure is thereupon again removed from the flux. It is of no consequence whether the flux is cooled or not before the metal is removed. In both cases remnants of the bath which might adhere to the surface of the metal may be removed by mechanical means. By polishing the metal a shining surface may be given to the same.

What I claim as my invention and desire to secure by Letters Patent is:

1. The method of purifying impure metallic beryllium comprising mixing halogen compounds of metals including at least one alkaline-earth-halogenide and other substances that do not react with the beryllium, heating the said mixed compounds until they are molten, and introducing the beryllium to be purified into the said molten compounds.

2. The method of purifying impure metallic beryllium comprising mixing halogen compounds of metals, including calcium halogenide, which do not react with the beryllium, heating the said mixed compounds until they are molten, and introducing the beryllium to be purified into the said molten compounds.

3. The method of purifying impure metallic beryllium comprising mixing alkaline-earth-halogenide and alkali-halogenide, heating the said mixed compounds until they are molten, and introducing the beryllium to be purified into the said molten compounds.

4. The method of purifying impure metallic-beryllium which comprises mixing calcium-halogenide and sodium-halogenide, heating the said mixed compounds until they are molten, and introducing the beryllium to be purified into the said molten compounds.

5. The method of purifying impure metallic beryllium comprising mixing calcium-chloride and calcium-fluoride, heating the said mixed compounds until they are molten, and introducing the beryllium to be purified into the said molten compounds.

6. The method of purifying impure metallic beryllium comprising mixing calcium-chloride and calcium-fluoride in the quantitative ratio of 1:1, heating the said mixed compounds until they are molten and introducing the beryllium to be purified into the said molten compounds.

7. The method of purifying impure metallic beryllium comprising mixing calcium-chloride, calcium-fluoride and sodium-chloride, heating the said mixed compounds until they are molten, and introducing the beryllium to be purified into the said molten compounds.

In testimony whereof I affix my signature.

HELLMUT FISCHER.